(12) United States Patent
König et al.

(10) Patent No.: US 7,305,512 B2
(45) Date of Patent: Dec. 4, 2007

(54) PROGRAMME-CONTROLLED UNIT WITH CROSSBAR EMPLOYING A DIAGNOSTIC PORT

(75) Inventors: Dietmar König, München (DE); Harry Siebert, Puchheim (DE)

(73) Assignee: Infineon Technologies AG, Neubiberg (DE)

( * ) Notice: Subject to any disclaimer, the term of this patent is extended or adjusted under 35 U.S.C. 154(b) by 144 days.

(21) Appl. No.: 11/031,741

(22) Filed: Jan. 6, 2005

(65) Prior Publication Data

US 2005/0163114 A1  Jul. 28, 2005

(30) Foreign Application Priority Data

Jan. 6, 2004 (EP) ................... 04000081

(51) Int. Cl.
*G06F 13/00* (2006.01)
(52) U.S. Cl. ............... 710/317; 710/316; 370/386
(58) Field of Classification Search ........ 710/316–317, 710/36–38; 714/25–28, 724–731; 370/386
See application file for complete search history.

(56) References Cited

U.S. PATENT DOCUMENTS

| | | | | |
|---|---|---|---|---|
| 6,425,101 | B1 * | 7/2002 | Garreau ............... | 714/727 |
| 2002/0144201 | A1 * | 10/2002 | Mayer et al. ......... | 714/726 |
| 2002/0147940 | A1 | 10/2002 | Smith et al. ......... | 714/31 |
| 2002/0157040 | A1 * | 10/2002 | Barrenscheen et al. | 714/28 |
| 2004/0153760 | A1 * | 8/2004 | Mayer ................. | 714/14 |

FOREIGN PATENT DOCUMENTS

WO   WO 00/07103   2/2000

OTHER PUBLICATIONS

Alfred K. Wong et al.; "Rigorous Three-Dimensional Time-Domain Finite-Difference Electromagnetic Simulation for Photolithographic Applications"; IEEE Transactions on Semiconductor Manufacturing, Nov. 1995.

Andreas Erdmann et al.; "3D Electromagnetic Field Simulation for Low-$K_1$ Lithography"; Microlithography World, Pennwell Publishing, Feb. 2001.

A.K. Wong et al.; "Mask Topography Effects in Projection Printing of Phase-Shifting Masks"; IEEE Transactions on Electron Devices, Jun. 1994.

Wilhelm Maurer et al.; "Proximity Effects of Alternating Phase shift Masks"; SPIE, 1999.

Olivier Toublan et al.; Phase and Transmission Errors Aware OPC Solution for PSM: Feasibility Demonstration; Mentor Graphics, Baccus, 2000.

K. Adam et al.; "Simplified Models for Edge Transitions in Rigorous Mask Modeling": University of California at Berkeley; SPIE, 2001.

* cited by examiner

*Primary Examiner*—Raymond N Phan
(74) *Attorney, Agent, or Firm*—Dickstein, Shapiro, LLP.

(57) ABSTRACT

A programme-controlled unit comprises a crossbar with a multiplicity of ports, a multiplicity of devices which are connected to the ports of the crossbar and can exchange data via the crossbar, and debug resources for detecting the events and states occurring in the programme-controlled unit. The programme-controlled unit described can be characterized by the fact that the ports of the crossbar comprise a diagnostic port, that the addresses, data and/or control signals which are transmitted between two other ports of the crossbar are additionally also supplied to the diagnostic port, and that the debug resources are connected to the diagnostic port of the crossbar.

18 Claims, 2 Drawing Sheets

PROGRAMME-CONTROLLED UNIT WITH CROSSBAR EMPLOYING A DIAGNOSTIC PORT

PRIORITY

This application claims priority from European Patent Application No. 04 000 081.2, which was filed on Jan. 6, 2004.

1. Technical Field of the Invention

The present invention relates to a programme-controlled unit comprising a crossbar comprising a multiplicity of ports, a multiplicity of devices which are connected to the ports of the crossbar and can exchange data via the crossbar, and debug resources for detecting the events and states occurring in the programme-controlled unit.

2. Description of Prior Art

Programme-controlled units are understood to be devices executing software programmes such as, for example, microcontrollers, microprocessors, signal processors etc.

The basic configuration of a programme-controlled unit is shown in FIG. 3. FIG. 3 shows a microcontroller. For the sake of completeness, it shall be noted at this point that only the components of the microcontroller are shown and described which are of particular interest in the present text.

In the microcontroller shown in FIG. 3 contains a bust 301, devices 302-1 to 302-n connected to one another via the bus and debug resources 303, also connected to the bus 301, the debug resources 303 consisting of a monitoring device 304 and a control device 305.

Of the microcontroller components mentioned, the device 302-1 is a first CPU, the device 302-2 is a second CPU, the device 302-n-1 is a storage device and the device 302-n is an I/O controller. Naturally, the devices 302-1, 302-2, 302-n-1 and 302-n can also be formed by any other microcontroller components. In addition, a multiplicity of arbitrary other microcontroller components such as, for example, other CPUs, storage devices and/or other peripheral units such as, for example, analogue/digital converters, digital/analogue converters, timers, DMA controllers etc. are usually connected to the bus 301.

The devices 302-1 to 302-n can exchange data via the bus 301. For example:
- the CPUs 302-1 and 302-2 can transmit data to the storage device 302-n-1 and/or read data from the storage device 302-n-1 via the bus 301,
- the first CPU 302-1 can transmit data, which are to be output from the microcontroller by the I/O controller 302-n, to the I/O controller via the bus 301, or
- the second CPU 302-2 can read data from the microcontroller which were received by the I/O controller 302-n from outside the microcontroller via the bus 301, etc.

The debug resources 303 or, more precisely, their monitoring device 304, tracks the addresses, data and control signals transmitted via the bus 301 and forwards selected addresses, data and/or control signals to the control device 305. The control device 305 outputs the addresses, data and/or control signals supplied to it to an external control and evaluating device, not shown in FIG. 3, provided outside the microcontroller, or provides them for being fetched by the external control and evaluating device. The external control and evaluating device evaluates the addresses, data and/or control signals supplied to it and called trace data and, during this process, can detect errors occurring in the microcontroller and their cause. The external control and evaluating device also instructs the control device 305 about the prerequisites under which addresses, data and/or control signals are to be output to the external control and evaluating device. The control device 305 performs corresponding filtering of the data supplied to it by the monitoring device 304 and/or causes the monitoring device 304 to forward only particular addresses, data and/or control signals, and/or addresses, data and/or control signals only on the occurrence of particular states or events, to the control device 305. In addition, the control device 305 can be capable of processing the data supplied to it by the monitoring device 304 before they are forwarded to the external control and evaluating device, particularly of coding or compressing the data to be forwarded or of packaging the data to be forwarded into messages having a predetermined format, or of transmitting the data together with other data, for example together with time information representing the time of data acquisition or with sequence information representing the sequence of data acquisition, to the external control and evaluating device.

The debug resources 303 are formed by an on-chip debug support module (OCDS module) or a part of an OCDS module. Reference is made to DE 101 19 266 A1 with respect to further details relating to debug resources configured and operating as described.

It is particularly due to the ever increasing clock frequencies with which microcontrollers and other programme-controlled units are operating, and due to the ever increasing number of microcontroller components which must be connected to one another via the bus, that it is becoming increasingly more difficult to transmit via the bus 301 the data which are to be transmitted between the microcontroller components connected to the bus.

In the meantime, therefore, it has been decided to connect at least certain microcontroller components to one another via a crossbar.

FIG. 4 shows an arrangement in which the first CPU 302-1, the second CPU 302-2, the storage device 302-n-1 and the I/O controller 302-n are connected to one another via a crossbar. The arrangement shown in FIG. 4 contains a crossbar 410 and the above-mentioned devices 302-1, 302-2, 302-n-1, 302-n. The crossbar 410 contains four ports designated by the reference symbols 411, 412, 413 and 414, one of the devices to be connected to one another via the crossbar being connected to each port. In the example considered, the first CPU 302-1 is connected to the first port 411, the second CPU 302-2 is connected to the second port 412, the storage device 302-n-1 is connected to the third port 413 and the I/O controller 302-n is connected to the fourth port 414. The crossbar 410 has in its interior configurable paths via which each device which could become bus master at bus 301, that is to say the first CPU 302-1 and the second CPU 302-2 in the example considered, can be connected to each of the other devices in each case. Crossbars can be constructed in such a manner that at the same time a number of different connections exist between the devices connected thereto so that, for example, the first CPU 302-1 can transmit data to the storage device 302-n-1 and, at the same time, the second CPU 302-2 can read data from the I/O controller 302-10. By this means, data which are to be transmitted between the devices connected to the crossbar 410 can be transmitted more rapidly, more precisely with less delay, on average than is the case with devices connected to one another via a bus.

With such an arrangement, however, greater effort is associated with tracing and evaluating the addresses, data and/or control signals which are transmitted between the devices connected to the crossbar 310. This is because, in this case, a total of four buses must be monitored, specifically the bus between the first CPU 302-1 and the first port

411, the bus between the second CPU 302-2 and the second port 412, the bus between the storage device 302-n-1 and the third port 413, and the bus between the I/O controller 302-n and the fourth port 414. To trace and evaluate addresses, data and/or control signals transmitted via a number of different buses, the debug resources 303 must be connected to all buses, or a number of debug resources of the type of debug resources 303 corresponding to the number of buses must be provided. It can be seen, that both are associated with much greater effort than tracing and evaluating the addresses, data and/or control signals which are transmitted via the bus 301 of the arrangement shown in FIG. 3.

SUMMARY OF THE INVENTION

The present invention has the object, therefore, of finding a possibility by means of which the addresses, data and/or control signals transmitted between devices connected to one another via a crossbar can be traced and evaluated by using debug resources of simple configuration and operating mode.

According to the invention, this object can be achieved by a programme-controlled unit comprising a crossbar with a multiplicity of ports, a multiplicity of devices which are connected to the ports of the crossbar and can exchange data via the crossbar, and debug resources for detecting the events and states occurring in the programme-controlled unit, wherein the ports of the crossbar comprise a diagnostic port, wherein the addresses, data and/or control signals which are transmitted between two other ports of the crossbar are additionally also supplied to the diagnostic port, and wherein the debug resources are connected to the diagnostic port of the crossbar.

It may be provided that no addresses, data and/or control signals can be transmitted to one of the devices connected to the other ports via the diagnostic port. It may further be provided that the device connected to the diagnostic port cannot be addressed by any of the other devices which are connected to the other ports of the crossbar. The diagnostic port can be connected to at least two other ports of the crossbar via internal lines or buses. The diagnostic port can be connected via internal lines or buses to all other ports of the crossbar to which master devices are connected. The diagnostic port can be connected via internal lines or buses to all other ports of the crossbar to which slave devices are connected. The diagnostic port may contain a multiplexer by means of the drive to which it can be determined which of the addresses, data and/or control signals transmitted via the crossbar are output from the diagnostic port. The multiplexer can be controlled by the debug resources, and a control and evaluating device provided outside the programme-controlled unit may instruct the debug resources on how they have to behave. The multiplexer can be controlled by a control and evaluating device provided outside the programme-controlled unit. The multiplexer can be controlled by the crossbar. The multiplexer can be brought into a state predetermined from outside the programme-controlled unit and can be permanently held in this state. It can be monitored which of the devices connected to the crossbar transmit addresses, data and/or control signals to which other ones of the devices connected to the crossbar, and the multiplexer can be automatically driven or switched in each case in such a manner that all addresses, data and control signals transmitted from and to a particular one of the devices connected to the crossbar are output via the diagnostic port. The multiplexer can first be brought into a predetermined state, and the multiplexer can automatically be brought into a predetermined other state if a particular event has occurred outside the crossbar. The particular event may consist in that the addresses, data and/or control signals output from the diagnostic port meet a predetermined condition. The multiplexer can be automatically switched if a particular event occurs inside the crossbar. The particular event may consist in that an error detection device contained in one of the ports has detected the occurrence of an error, and in that, following the detection of the error, the multiplexer is switched in such a manner that the addresses, data and/or control signals transmitted via the port containing the relevant error detection device are output from the diagnostic port. Priorities are allocated to all possible internal connections between the ports of the crossbar, and the multiplexer can automatically be switched in such a manner that the addresses, data and/or control signals output from the diagnostic port are in each case those addresses, data and/or control signals which are transmitted via the connection to which the highest priority is allocated. The debug resources may contain a control and preprocessing device which delays the addresses, data and/or control signals output from the diagnostic port, before they are forwarded, by a different amount in such a manner that different amounts of delay of the addresses, data and/or control signals through the crossbar are compensated for, and the addresses, data and/or control signals simultaneously output from the control and preprocessing device are always associated addresses, data and/or control signals. The debug resources can cause certain components of the crossbar, via the diagnostic port and additional internal lines of the crossbar, to output information stored in the relevant components, and the multiplexer can be driven in such a manner that this information is output from the crossbar via the diagnostic port. The debug resources can be connected to devices connected to the crossbar via additional lines and, via these lines, the relevant devices can be caused to output information stored in the relevant devices to the bus connecting the relevant device to the crossbar, and wherein the multiplexer is driven in such a manner that this information is output from the crossbar via the diagnostic port.

The programme-controlled unit according to the invention is characterized by the fact
that the ports of the crossbar comprise a diagnostic port, that the addresses, data and/or control signals which are transmitted between two other ports of the crossbar are additionally also supplied to the diagnostic port, and
that the debug resources are connected to the diagnostic port of the crossbar.

In such a programme-controlled unit, it is not necessary to provide a number of debug resources nor is it necessary to connect the debug resources to all buses via which the devices connected to the crossbar are connected to the crossbar.

Thus, the addresses, data and/or control signals transmitted between devices connected to one another via a crossbar can be traced and evaluated by using debug resources of simple configuration and operating mode.

Advantageous developments of the invention can be found in the description following and the figures.

BRIEF DESCRIPTION OF THE DRAWINGS

The invention will be described in greater detail by means of illustrative embodiments and reference to the figures, in which.

DESCRIPTION OF PREFERRED EMBODIMENTS

The programme-controlled units described in the text which follows are microcontrollers. However, there could also be other devices executing programmes such as, for example, microprocessors, signal processors etc.

Figure 1:
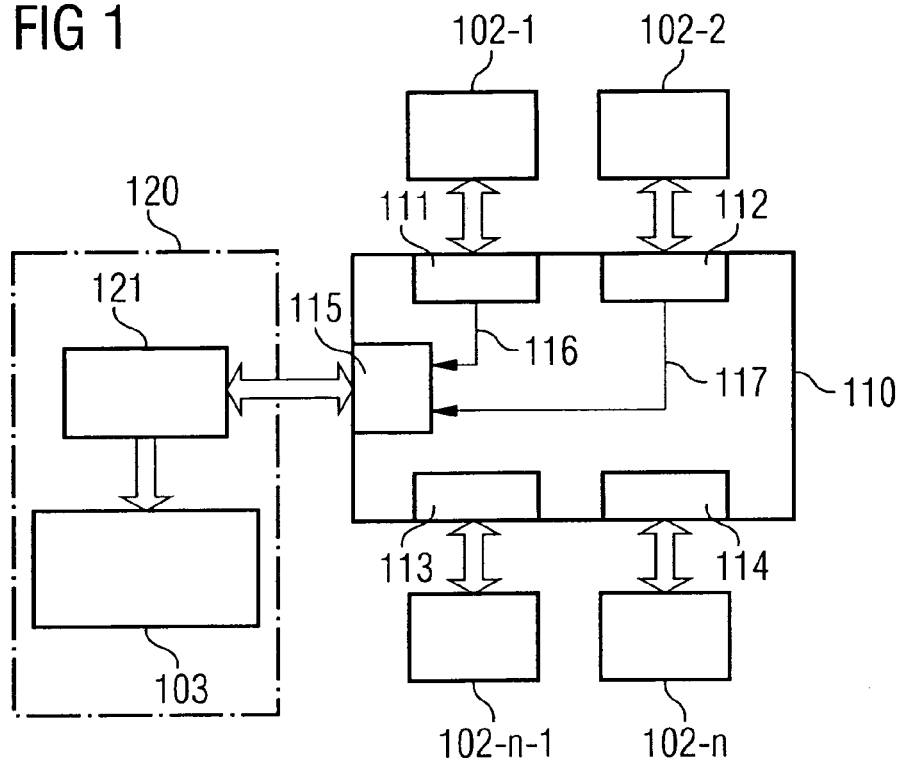
FIG. 1 shows a first illustrative embodiment of the programme-controlled unit presented here.
Figure 2:
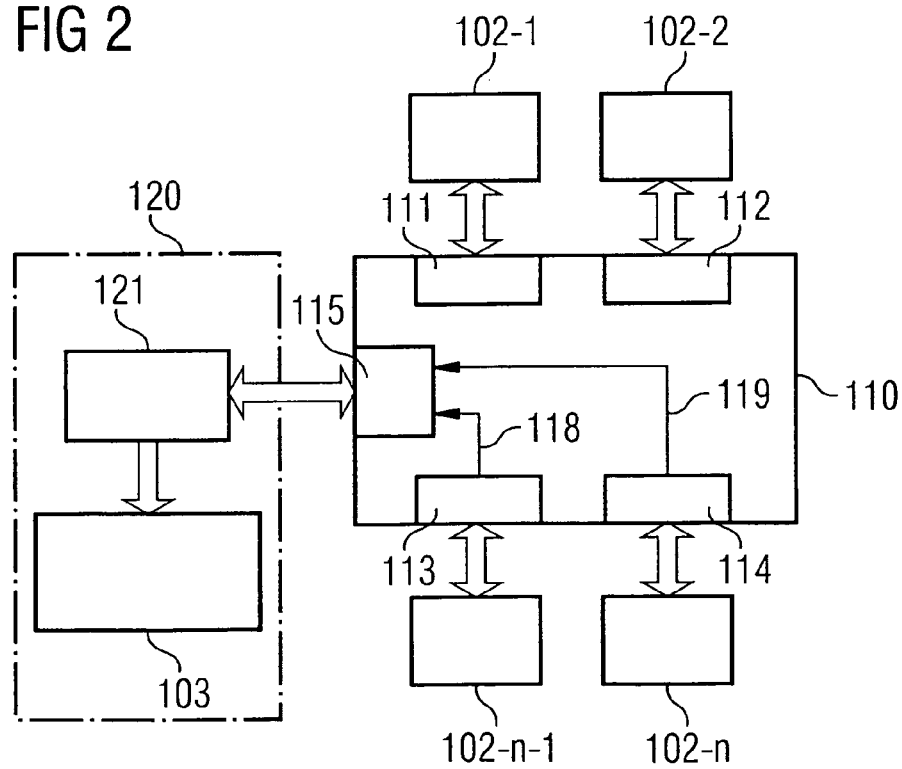
FIG. 2 shows a second illustrative embodiment of the programme-controlled unit presented here.

It should be noted even at this early point that only the components of the microcontrollers of particular interest in the present text are shown in FIGS. 1 and 2 and described.

Figure 4:
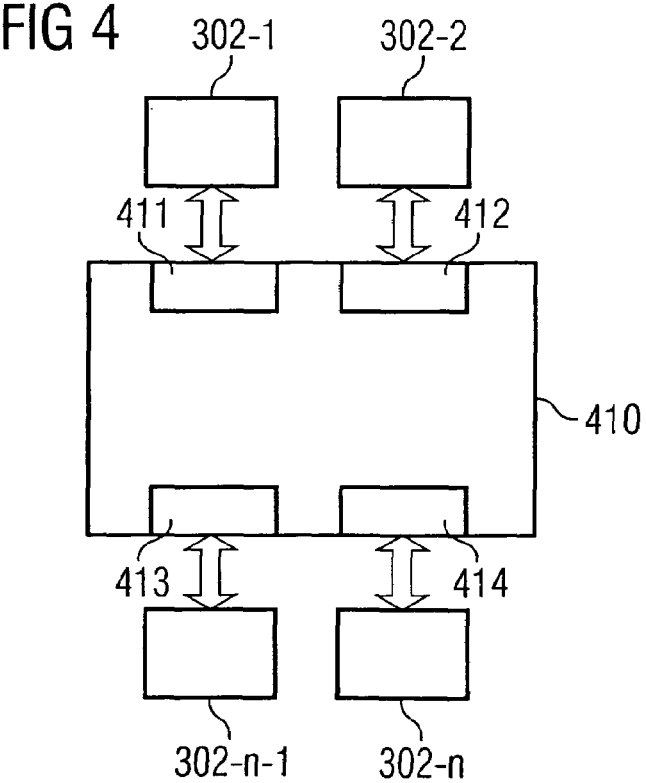
FIG. 4 shows a conventional programme-controlled unit in which devices to be connected to one another are connected to one another via a crossbar.

The microcontrollers presented here are microcontrollers in which the components to be connected to one another, such as CPU, memory, I/O controller etc. are at least partially connected to one another via a crossbar. Thus, they are microcontrollers of the type shown in FIG. 4. However, in the case of the microcontrollers presented here, it is possible to trace the addresses, data and/or control signals transmitted between the devices connected to the crossbar by means of debug resources of simple configuration and operating mode.

The arrangement shown in FIG. 1 comprises a crossbar 110, devices 102-1, 102-2, 102-n-1 and 102-n connected to one another via the crossbar 110, and debug resources 120.

Of the devices 102-1, 102-2, 102-n-1 and 102-n, the device 102-1 is a first CPU, the device 102-2 is a second CPU, the device 102-n-1 is a storage device and the device 102-n is an I/O controller. The said devices correspond to the devices 302-1, 302-2, 302-n-1 and 302-n of the arrangements shown in FIGS. 3 and 4. For the sake of completeness, it should be noted at this point that the devices 102-1, 102-2, 102-n-1 and 102-n could also be formed by any other microcontroller components. In the example considered, the devices 102-1 and 102-2 are master devices corresponding to a bus master, and the devices 102-n-1 and 102-n are slave devices corresponding to a bus slave.

The crossbar 110 contains ports designated by the reference symbols 111, 112, 113 and 114, one of the devices to be connected to one another via the crossbar 110 being connected to each port. In the example considered, the first CPU 102-1 is connected to the first port 111, the second CPU 102-2 is connected to the second port 112, the storage device 102-n-1 is connected to the third port 113 and the I/O controller 102-n is connected to the fourth port 114. The crossbar 110 has in its interior configurable paths, not shown in FIG. 1, via which each master device, that is to say the first CPU 102-1 and the second CPU 102-2 in the example considered, can be connected to each of the other devices in each case. In addition, the crossbar 110 contains a control device, also not shown in FIG. 1, which ensures by a corresponding configuration of the configurable paths that devices in each case to be connected to one another are connected to one another. More precisely, a master device which wants to transmit data to another device or to read data from the other devices transmits to the crossbar an address associated with the other device, and the control device recognizes from this address the device with which the relevant master device wishes to communicate, and then establishes a connection between the relevant master device and the other device specified by the address.

In addition, the crossbar 110 contains a fifth port 115, designated as diagnostic port in the text which follows, to which the debug resources 120 are connected. Via the diagnostic port 115, it is possible only to read data from the crossbar 110 but not to transmit data to one of the other devices 102-1, 102-2, 102-n-1 and 102-n which are connected to the crossbar 110. In addition, the diagnostic port 115 or the debug resources 125 connected thereto, respectively, cannot be addressed by one of the master devices. That is to say, the debug resources 120 can neither output data to another one of the devices connected to the crossbar 110 nor be addressed by one of these other devices.

In the example considered, the diagnostic port 115 is connected via lines or buses 116 and 117 to the ports to which master devices are connected. More precisely, the diagnostic port 115 is connected via a line or a bus 116 to the first port 111, and via a line or a bus 117 to the second port 112. Via the diagnostic port 115, the addresses, data and/or control signals which are transmitted from and to the device connected to the first port 111 via the crossbar 110, and/or are transmitted from and to the device connected to the second port 112, are output to the debug resources 120. In the diagnostic port 115, a multiplexer, not shown in FIG. 1, is provided by means of which optionally either the data transmitted via the first port 111 or the data transmitted via the second port 112 are switched through to the debug resources 120.

The debug resources 120 consist of a control and monitoring device 103 and a control and preprocessing device 121.

The addresses, data and/or control signals output from the diagnostic port 115 to the debug resources 120 initially pass to the control and preprocessing device 121 and are forwarded by the latter, after any processing which may be required, to the control and monitoring device 103.

Figure 3:
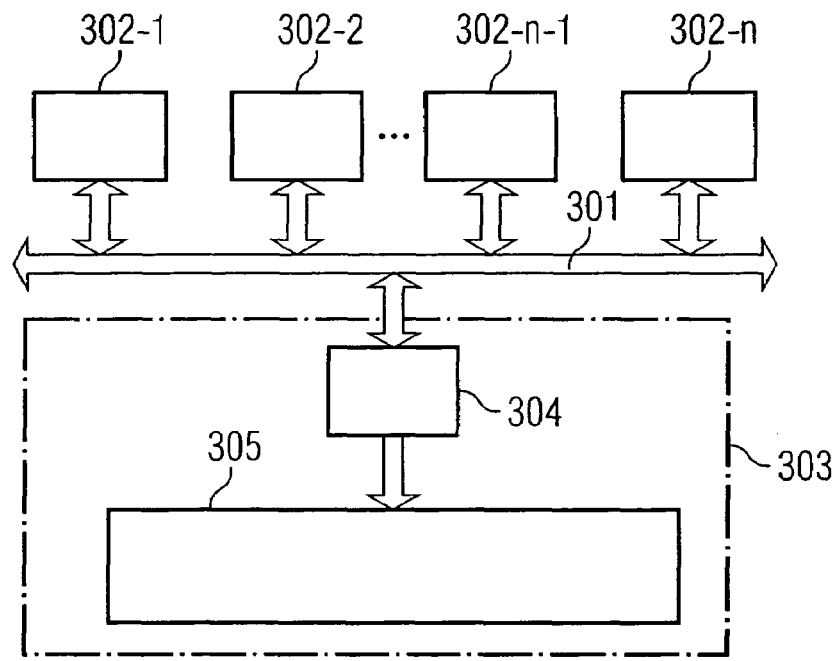
FIG. 3 shows a conventional programme-controlled unit in which devices to be connected to one another are connected to one another via a bus.

The control and monitoring device 103 corresponds to the debug resources 303 of the arrangement according to FIG. 3. That is to say, it selects particular addresses, data and/or control signals from the addresses, data and/or control signals supplied to it and forwards them as trace data to an external control and evaluating device provided outside the microcontroller. With regard to other details on the configuration and the operation of the control and monitoring device 103, reference is made to the corresponding statements relating to the debug resources 303.

The preprocessing, performed by the control and preprocessing device 121, of the addresses, data and/or control signals supplied to it from the crossbar 110 can comprise, for example, delaying the addresses, data and control signals by a different amount before forwarding them to the control and monitoring device 103. This makes it possible to achieve that the addresses, data and control signals output from the control and preprocessing device 121 are always associated addresses, data and control signals. This is found to be advantageous because it may be that the addresses, data and control signals output from the diagnostic port 115 of the crossbar 110 are non-associated addresses, data and control signals. This is because, in general, for example, pipeline stages formed by registers are installed in the configurable paths between the ports 111 to 114 of the crossbar 110, a different number of pipeline stages possibly being provided in the paths for transmitting the addresses, in the paths for transmitting the data and in the paths for transmitting the control signals. For example, it may be that the address path has two pipeline stages between the first port 111 and the third port 113, and that the data path and the control signal path have three pipelines between the first port 111 and the third port 113 so that the addresses have less delay through the crossbar 110 than the data and the control signals. It could be provided in this case that when the addresses, data and control signals output from the diagnostic port 115 of the crossbar 110 are addresses, data and control signals transmitted from the storage device 102-n-1 to the first CPU 102-1, the control and preprocessing device 121 forwards the addresses with a delay to the control and monitoring device 103, and forwards the data and the control signals immediately to the control and monitoring device 103, the duration of the delay in forwarding the addresses corresponding to the difference in the delays of the addresses, data and control signals through the crossbar. Consequently, the addresses, data and control signals simultaneously output from the control and preprocessing device 121 are always associated addresses, data and control signals.

The control and preprocessing device 121 moreover controls the multiplexer contained in the diagnostic port 115. How this is to be performed, more precisely how the multiplexer is to be driven under what preconditions, takes the form of instruction by the control and preprocessing device 121, the control and monitoring device 103 in the example considered, which device for its part receives corresponding instructions from the external control and evaluation device. It may be remarked for the sake of completeness that the control and preprocessing device 121 could also be instructed on how it is to behave by another microcontroller component, or directly by the external control and evaluation device. The control of the control and preprocessing device 121, and even the control of the multiplexer, can also be performed by signals transmitted via the crossbar, more precisely by control signals transmitted via so-called sideband lines. The multiplexer can also be controlled via the crossbar 110.

In the example considered, there are five different possibilities for driving the multiplexer.

When the multiplexer is driven in accordance with the fifth possibility (jump event mode), priorities are allocated to all possible internal connections between the ports 111 to 114, and the multiplexer is driven in such a manner that the addresses, data and control signals output from the diagnostic port are in each case the addresses, data and control signals transmitted via the connection which is allocated the highest priority.

FIG. 2 shows a modified embodiment of the arrangement shown in FIG. 1.

The arrangement shown in FIG. 2 very largely corresponds to the arrangement shown in FIG. 1. Components designated by the same reference symbols are identical or mutually corresponding components. The only difference is the ports of the crossbar 110 to which the diagnostic port 115 is connected. In the arrangement shown in FIG. 2, the diagnostic port 115 is connected to the ports to which slave devices are connected. More precisely, the diagnostic port 115 is connected to the third port 113 via a line or a bus 118, and to the fifth port 114 via a line or a bus 119. Thus, the addresses, data and/or control signals transmitted via the crossbar 110 from and to the device connected to the third port 113 and/or transmitted from and to the device connected to the fifth port 114 can be output to the debug resources 120 via the diagnostic port 115; via the multiplexer contained in the diagnostic port 115, either the addresses, data and/or control signals transmitted via the third port 113, and/or the addresses, data and/or control signals transmitted via the fourth port 114 are optionally switched through to the debug resources 120.

The abovementioned differences require a modified drive to the multiplexer. In particular the first possibility for multiplexer control already explained above (static mode) is used when all addresses, data and/or control signals transmitted via the third port 113 are to be output via the diagnostic port 115, or when all addresses, data and/or control signals transmitted via the fourth port 114 are to be output via the diagnostic port 115, and the second possibility for multiplexer drive already explained above (dynamic mode) is used when all addresses, data and/or control signals transmitted via the first port 111 are to be output via the diagnostic port 115, or when all addresses, data and/or control signals transmitted via the second port 112 are to be output via the diagnostic port 115.

For the rest, the arrangement shown in FIG. 2 operates like the arrangement shown in FIG. 1.

The arrangements described can be modified and expanded in many ways.

For example, it is possible that the crossbar contains one or more further diagnostic ports. This is found to be advantageous because data transfers taking place simultaneously between various pairs of ports can be detected in this case.

Independently of this, it could be provided that storage devices contained in the other ports, for example registers contained in the error detection devices and in which information on errors which have occurred or the states prevailing on the occurrence of an error such as, for example, the current configuration of the configurable paths is stored, are read out via the diagnostic port. This can be done by the debug resources causing particular components of the crossbar, via the diagnostic port and additional internal lines of the crossbar, to output information stored in the corresponding components, and by the multiplexer being driven in such a manner that this information is output from the crossbar via the diagnostic port.

It could also be provided that the debug resources 120 are additionally connected to one, a number or all of the devices connected to the ports 111 to 114 via one or more separate lines, and that the debug resources 120 can cause the respective devices to output particular internal information to the bus connecting the relevant device to the crossbar via the additional lines. This information could then be detected by a corresponding multiplexer drive, output from the crossbar 110 via the diagnostic port 115 thereof, and evaluated by the external control and evaluating device.

Independently of the details of their practical implementation, the arrangements described above are found to be extremely advantageous. They make it possible for the addresses, data and/or control signals transmitted between devices connected to one another via a crossbar to be traced and evaluated by using debug resources of simple configuration and operating mode.

We claim:

1. A programme-controlled unit comprising a crossbar with a multiplicity of ports, a multiplicity of devices which are connected to the ports of the crossbar and can exchange data via the crossbar, and debug resources for detecting the events and states occurring in the programme-controlled unit, wherein the ports of the crossbar comprise a diagnostic port, wherein the addresses, data and/or control signals which are transmitted between two other ports of the crossbar are also supplied to the diagnostic port, and wherein the debug resources are connected to the diagnostic port of the crossbar, the diagnostic port contains a multiplexer by means of the drive to which it can be determined which of the addresses, data and/or control signals transmitted via the crossbar are output from the diagnostic port, and wherein the multiplexer is brought into a state predetermined from outside the programme-controlled unit and is permanently held in this state.

2. The programme controlled unit according to claim 1, wherein the diagnostic port is connected to at least two other ports of the crossbar via internal lines or buses.

3. The programme controlled unit according to claim 1, wherein the multiplexer is controlled by the debug resources, and wherein a control and evaluating device provided outside the programme-controlled unit instructs the debug resources on how they have to behave.

4. The programme controlled unit according to claim 1, wherein the multiplexer is controlled by a control and evaluating device provided outside the programme-controlled unit.

5. The programme controlled unit according to claim 1, wherein the multiplexer is controlled by the crossbar.

6. The programme controlled unit according to claim 1, wherein the multiplexer is automatically switched if a particular event occurs inside the crossbar.

7. The programme controlled unit according to claim 2, wherein the diagnostic port is connected via internal lines or buses to all other ports of the crossbar to which master devices are connected.

8. The programme controlled unit according to claim 2, wherein the diagnostic port is connected via internal lines or buses to all other ports of the crossbar to which slave devices are connected.

9. A programme-controlled unit comprising
a crossbar with a multiplicity of ports,
a multiplicity of devices which are connected to the ports of the crossbar and can exchange data via the crossbar, and
debug resources for detecting the events and states occurring in the programme-controlled unit,
wherein the ports of the crossbar comprise a diagnostic port,
wherein the addresses, data and/or control signals which are transmitted between two other ports of the crossbar are also supplied to the diagnostic port,
wherein the debug resources are connected to the diagnostic port of the crossbar, and
wherein no addresses, data and/or control signals can be transmitted to one of the devices connected to the other ports via the diagnostic port.

10. A programme-controlled unit comprising
a crossbar with a multiplicity of ports,
a multiplicity of devices which are connected to the ports of the crossbar and can exchange data via the crossbar, and
debug resources for detecting the events and states occurring in the programme-controlled unit,
wherein the ports of the crossbar comprise a diagnostic port,
wherein the addresses, data and/or control signals which are transmitted between two other ports of the crossbar are also supplied to the diagnostic port,
wherein the debug resources are connected to the diagnostic port of the crossbar, and
wherein the device connected to the diagnostic port cannot be addressed by any of the other devices which are connected to the other ports of the crossbar.

11. A programme-controlled unit comprising
a crossbar with a multiplicity of ports,
a multiplicity of devices which are connected to the ports of the crossbar and can exchange data via the crossbar, and
debug resources for detecting the events and states occurring in the programme-controlled unit,
wherein the ports of the crossbar comprise a diagnostic port,
wherein the addresses, data and/or control signals which are transmitted between two other ports of the crossbar are also supplied to the diagnostic port,
wherein the debug resources are connected to the diagnostic port of the crossbar,
wherein the diagnostic port contains a multiplexer by means of the drive to which it can be determined which of the addresses, data and/or control signals transmitted via the crossbar are output from the diagnostic port, and wherein
it is monitored which of the devices connected to the crossbar transmit addresses, data and/or control signals to which other ones of the devices connected to the crossbar, and
the multiplexer is automatically driven or switched in each case in such a manner that all addresses, data and control signals transmitted from and to a particular one of the devices connected to the crossbar are output via the diagnostic port.

12. A programme-controlled unit comprising
a crossbar with a multiplicity of ports,
a multiplicity of devices which are connected to the ports of the crossbar and can exchange data via the crossbar, and
debug resources for detecting the events and states occurring in the programme-controlled unit,
wherein the ports of the crossbar comprise a diagnostic port,
wherein the addresses, data and/or control signals which are transmitted between two other ports of the crossbar are also supplied to the diagnostic port,
wherein the debug resources are connected to the diagnostic port of the crossbar,
wherein the diagnostic port contains a multiplexer by means of the drive to which it can be determined which of the addresses, data and/or control signals transmitted via the crossbar are output from the diagnostic port, and
wherein the multiplexer is first brought into a predetermined state, and wherein the multiplexer is automatically brought into a predetermined other state if a particular event has occurred outside the crossbar.

13. The programme controlled unit according to claim 12, wherein the particular event consists in that the addresses, data and/or control signals output from the diagnostic port meet a predetermined condition.

14. A programme-controlled unit comprising
a crossbar with a multiplicity of ports,
a multiplicity of devices which are connected to the ports of the crossbar and can exchange data via the crossbar, and
debug resources for detecting the events and states occurring in the programme-controlled unit,
wherein the ports of the crossbar comprise a diagnostic port, wherein the addresses, data and/or control signals which are transmitted between two other ports of the crossbar are also supplied to the diagnostic port, wherein the debug resources are connected to the diagnostic port of the crossbar, wherein the diagnostic port contains a multiplexer by means of the drive to which it can be determined which of the addresses, data and/or control signals transmitted via the crossbar are output from the diagnostic port, wherein the multiplexer is automatically switched if a particular event occurs inside the crossbar, and wherein the particular event consists in that an error detection device contained in one of the ports has detected the occurrence of an error, and in that, following the detection of the error, the multiplexer is switched in such a manner that the addresses, data and/or control signals transmitted via the port containing the relevant error detection device are output from the diagnostic port.

15. A programme-controlled unit comprising a crossbar with a multiplicity of ports, a multiplicity of devices which are connected to the ports of the crossbar and can exchange data via the crossbar, and debug resources for detecting the events and states occurring in the programme-controlled unit, wherein the ports of the crossbar comprise a diagnostic port, wherein the addresses, data and/or control signals which are transmitted between two other ports of the crossbar are also supplied to the diagnostic port, wherein the debug resources are connected to the diagnostic port of the crossbar, wherein the diagnostic port contains a multiplexer by means of the drive to which it can be determined which of the addresses, data and/or control signals transmitted via the crossbar are output from the diagnostic port, and wherein priorities are allocated to all possible internal connections between the ports of the crossbar, and wherein the multiplexer is automatically switched in such a manner that the addresses, data and/or control signals output from the diagnostic port are in each case those addresses, data and/or control signals which are transmitted via the connection to which the highest priority is allocated.

16. A programme-controlled unit comprising a crossbar with a multiplicity of ports, a multiplicity of devices which are connected to the ports of the crossbar and can exchange data via the crossbar, and debug resources for detecting the events and states occurring in the programme-controlled unit, wherein the ports of the crossbar comprise a diagnostic port, wherein the addresses, data and/or control signals which are transmitted between two other ports of the crossbar are also supplied to the diagnostic port, wherein the debug resources are connected to the diagnostic port of the crossbar, and wherein the debug resources contain a control and preprocessing device which delays the addresses, data and/or control signals output from the diagnostic port, before they are forwarded, by a different amount in such a manner that different amounts of delay of the addresses, data and/or control signals through the crossbar are compensated for, and the addresses, data and/or control signals simultaneously output from the control and preprocessing device are always associated addresses, data and/or control signals.

17. A programme-controlled unit comprising a crossbar with a multiplicity of ports, a multiplicity of devices which are connected to the ports of the crossbar and can exchange data via the crossbar, and debug resources for detecting the events and states occurring in the programme-controlled unit, wherein the ports of the crossbar comprise a diagnostic port, wherein the addresses, data and/or control signals which are transmitted between two other ports of the crossbar are also supplied to the diagnostic port, wherein the debug resources are connected to the diagnostic port of the crossbar, and wherein the debug resources can cause certain components of the crossbar, via the diagnostic port and additional internal lines of the crossbar, to output information stored in the relevant components, and wherein the multiplexer is driven in such a manner that this information is output from the crossbar via the diagnostic port.

18. A programme-controlled unit comprising a crossbar with a multiplicity of ports, a multiplicity of devices which are connected to the ports of the crossbar and can exchange data via the crossbar, and debug resources for detecting the events and states occurring in the programme-controlled unit, wherein the ports of the crossbar comprise a diagnostic port, wherein the addresses, data and/or control signals which are transmitted between two other ports of the crossbar are also supplied to the diagnostic port, wherein the debug resources are connected to the diagnostic port of the crossbar, and wherein the debug resources are connected to devices connected to the crossbar via additional lines and, via these lines, the relevant devices can be caused to output information stored in the relevant devices to the bus connecting the relevant device to the crossbar, and wherein the multiplexer is driven in such a manner that this information is output from the crossbar via the diagnostic port.

* * * * *